(12) United States Patent
Kenna et al.

(10) Patent No.: US 8,881,014 B2
(45) Date of Patent: Nov. 4, 2014

(54) WEB BASED SALES PRESENTATION METHOD AND SYSTEM WITH SYNCHRONIZED DISPLAY

(75) Inventors: Wayne Kenna, Suwanee, GA (US); Sutapa Das, Decatur, GA (US); Wesley Dupeire, Lawrenceville, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 645 days.

(21) Appl. No.: 12/612,654

(22) Filed: Nov. 4, 2009

(65) Prior Publication Data
US 2011/0107221 A1 May 5, 2011

(51) Int. Cl.
*G06F 3/01* (2006.01)
*G06Q 30/06* (2012.01)
*G06Q 30/00* (2012.01)

(52) U.S. Cl.
CPC ............ *G06Q 30/00* (2013.01); *G06Q 30/0601* (2013.01)
USPC .......................................... 715/730; 715/753

(58) Field of Classification Search
USPC .......................................... 715/740, 753, 755
See application file for complete search history.

(56) References Cited

U.S. PATENT DOCUMENTS

| | | | | |
|---|---|---|---|---|
| 5,390,246 | A * | 2/1995 | Gay et al. | 381/82 |
| 2001/0049637 | A1* | 12/2001 | Tso | 705/26 |
| 2002/0087592 | A1* | 7/2002 | Ghani | 707/500 |
| 2003/0191805 | A1* | 10/2003 | Seymour et al. | 709/204 |
| 2004/0001106 | A1* | 1/2004 | Deutscher et al. | 345/838 |
| 2004/0008223 | A1* | 1/2004 | Britton et al. | 345/762 |
| 2004/0039848 | A1* | 2/2004 | Estrada et al. | 709/315 |
| 2004/0230655 | A1* | 11/2004 | Li et al. | 709/205 |
| 2005/0039133 | A1* | 2/2005 | Wells et al. | 715/740 |
| 2005/0052405 | A1* | 3/2005 | Maulik et al. | 345/156 |
| 2006/0074775 | A1* | 4/2006 | Roman et al. | 705/27 |
| 2006/0075348 | A1* | 4/2006 | Xu et al. | 715/730 |
| 2007/0033217 | A1* | 2/2007 | Basner | 707/102 |
| 2007/0049261 | A1* | 3/2007 | Joglekar | 455/416 |
| 2007/0263825 | A1* | 11/2007 | Shah et al. | 379/202.01 |
| 2007/0286388 | A1* | 12/2007 | Vaught et al. | 379/202.01 |
| 2008/0028323 | A1* | 1/2008 | Rosen et al. | 715/752 |
| 2008/0120546 | A1* | 5/2008 | Pulier | 715/716 |
| 2008/0126953 | A1* | 5/2008 | Davidson et al. | 715/753 |
| 2008/0180391 | A1* | 7/2008 | Auciello et al. | 345/156 |
| 2009/0086957 | A1* | 4/2009 | Kelley et al. | 379/265.09 |
| 2009/0254839 | A1* | 10/2009 | Kripalani et al. | 715/753 |

(Continued)

OTHER PUBLICATIONS

Evite, "new! post your parties on facebook," Jun. 3, 2009, http://blog.evite.com/evite/2009/06/new-post-your-parties-on-facebook.html.*

*Primary Examiner* — Matt Kim
*Assistant Examiner* — Mahelet Shiberou
(74) *Attorney, Agent, or Firm* — Hartman & Citein LLC

(57) ABSTRACT

Systems and methods for facilitating web based sales presentations with synchronized display are provided According to one embodiment, a method comprises receiving a request from a sales representative to have an invitation sent to a customer to remotely view a presentation; sending a communication to the customer inviting the customer to view the presentation; storing the presentation at a storage unit associated with a server system; displaying at a first separate computer system of the sales representative, navigational links for selecting a slide of the presentation; in response to the customer selecting a URL included in the communication to the customer, displaying, at a second separate computer system of the customer, the presentation; and synchronizing a display of the presentation at the first separate computer system of the sales representative and the display of the presentation at the second separate computer system of the customer.

10 Claims, 9 Drawing Sheets

(56) References Cited

U.S. PATENT DOCUMENTS

| | | | |
|---|---|---|---|
| 2009/0307602 A1* | 12/2009 | Brewer et al. | 715/744 |
| 2009/0327425 A1* | 12/2009 | Gudipaty | 709/205 |
| 2010/0005142 A1* | 1/2010 | Xiao et al. | 709/204 |
| 2010/0023876 A1* | 1/2010 | Shuf et al. | 715/753 |
| 2010/0037151 A1* | 2/2010 | Ackerman et al. | 715/753 |
| 2010/0169790 A1* | 7/2010 | Vaughan et al. | 715/740 |
| 2010/0174773 A1* | 7/2010 | Penner et al. | 709/203 |
| 2010/0235216 A1* | 9/2010 | Hehmeyer et al. | 705/9 |

* cited by examiner

Invitation Form

Invite Form      Help

* All fields with asterisks are required fields.

306 Presentation Style: *    [Creative ▽]
308 Sales Rep ATT UID: *    [wk1234]
Sales Rep Name:    [Joe Rep]
Sales Rep Phone Number    [123   555   1234]
Sales Rep Fax Number:    [           ]
Business Name:*    [TestCustomer]
312 Customer E-Mail Address: *    [customer@email.com]
310 Manager ATT UID: *    [wd1234]
Optional E-Mail Address:    [           ]

To:
Bcc:
Cc:

[ Send Invite ] — 314

Home | Help |

FIGURE 3

WEB BASED SALES PRESENTATION METHOD AND SYSTEM WITH SYNCHRONIZED DISPLAY

FIELD OF THE TECHNOLOGY

At least some embodiments of the disclosure relate to a tool for sales representatives to present sales and marketing collateral to customers via a dual web interface allowing the sales representative to control the presentation and flow while the customer follows along.

BACKGROUND

Currently, the length of the average telephone sales interview is 4-6 minutes. Many sales representatives are struggling with engaging the customer for the necessary time to adequately fact find and introduce a company's full suite of products. In field observations, sales representatives were working from their order entry system screens, rather than referring to sales collateral.

Sales representatives need a new way to make a sales pitch to prospective customers from a remote location. Although there are numerous products and services available that provide remote display of a presentation, these products and services typically require software to be installed on each remote computer, and none easily provide talking points that only the presenter can see. For example, some products require using a projector with one screen showing the slides and notes and separate screen showing just the slides. Other products and services require a monthly or per-use service fee, and in yet other products and services require the presenter to upload the presentation or share it from their own computer system.

SUMMARY

Systems and methods are described herein to facilitate web based sales presentations with synchronized display. Some embodiments are summarized in this section.

In one embodiment, a computer implemented method comprises receiving, by a server system, a request from a sales representative to have an invitation sent to a customer to remotely view a presentation; sending, by the server system, a communication to the customer, inviting the customer to view the presentation, wherein the communication includes a Uniform Resource Locator (URL) providing access to remotely view the presentation; centrally storing the presentation at a storage unit associated with the server system, the presentation completed prior to receiving the request from the sales representative; exclusively displaying, by the server system, at a first separate computer system of the sales representative, navigational links for selecting a slide of the presentation centrally stored separately at the storage unit associated with the server system, for display at a second separate computer system of the customer, wherein the navigational links are not displayed at the second separate computer system of the customer; in response to the customer selecting the URL included in the communication to the customer, displaying, by the server system, at the second separate computer system of the customer, the presentation centrally stored separately at the storage unit, as separately navigated by the sales representative; and synchronizing, by the server system, a display of the presentation at the first separate computer system of the sales representative and the display of the presentation at the second separate computer system of the customer.

The disclosure herein includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 presents an illustration of a SEND INVITE FORM, in accordance with one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One embodiment as described herein provides a tool for sales reps (also referred to herein as "representatives") to present sales and marketing collateral to customers via a dual web interface allowing the sales rep to control the presentation and flow while the customer follows along. The Rep view has navigational links used to share the presentation with the customer one slide at a time. In one embodiment, presentations are prepared by marketing in advance for the sales reps to use, so that marketing can control the presentation and message that is presented to potential customers. Moreover, neither the rep or the customer need to upload files or share their desktop, like traditional conferencing solutions.

The rep and the customer simply go to their respective meeting URLs and the rep has complete control over when the presentation starts and what slides the customer sees. One embodiment utilizes features built into existing browsers (e.g., Internet Explorer), and therefore no software has to be installed or activated on the customer's or rep's computer. In one embodiment, the rep has the ability to select multiple styles of prepared presentations to tailor the discussion with the customer. In addition to selecting the overall style or type of presentation to use, the rep can pick and chose the slides to show to the customer, using the rep view of the presentation, without having to page through slides, or exit presentation mode.

Figure 1:
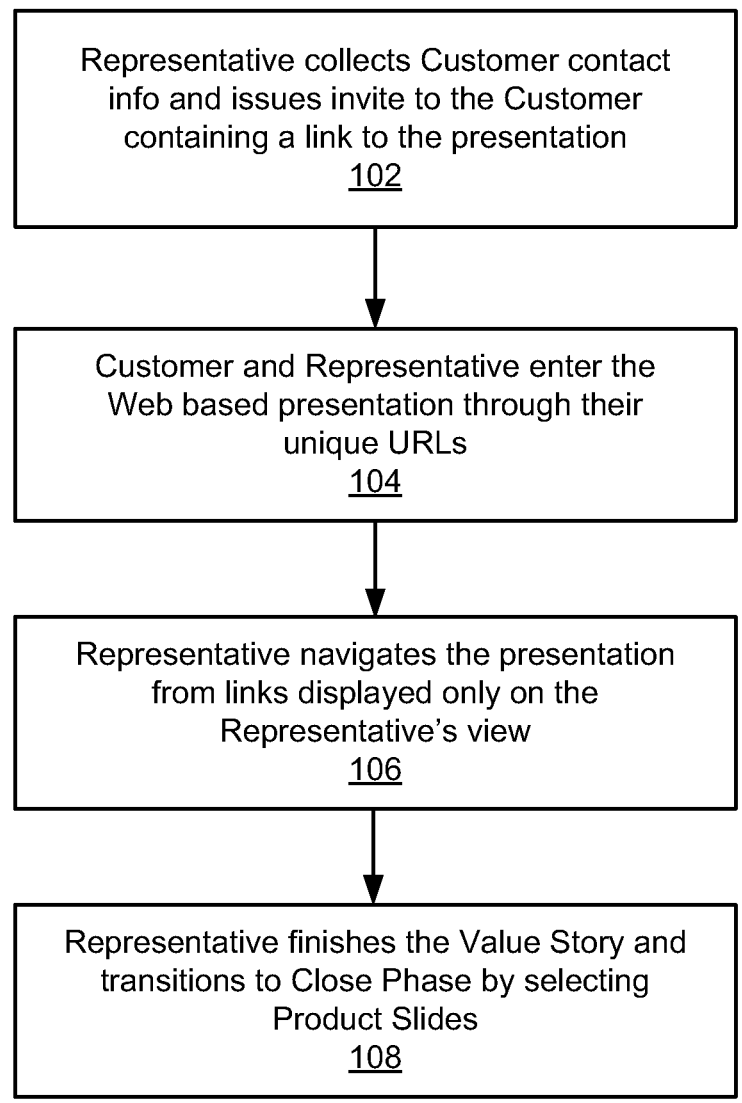
FIG. 1 presents a flow diagram describing an overview of the Web based sales presentations with synchronized dual display, according to one embodiment.

FIG. 1 presents a flow diagram describing an overview of the Web based sales presentations with synchronized dual display. In process 102, once in communication with the customer, the rep proceeds to obtain the customer's contact information (e.g., email address) and proceeds to send the customer a link to remotely view the web-based presentation. In process 104, once the customer and the rep enter into the website through their unique URL's, the presentation can begin. The customer does not need to login to the conference, selecting the unique URL both have received automatically provides access to the presentation.

In process 106, the rep activates the meeting and begins navigating through the presentation (e.g., one slide at a time) by clicking on the visible links within the rep's view (e.g., along the left hand side of their screen), which in one embodiment are presented only in the rep's view. In one embodiment, in process 108, when the rep has finished presenting the initial slides related to the value story, the rep can transition into the close phase of the call by selecting the product slides (e.g., displayed along the left hand side of the page within rep view). Any slide the rep clicks on will be automatically changed on the customers view.

Figure 2:
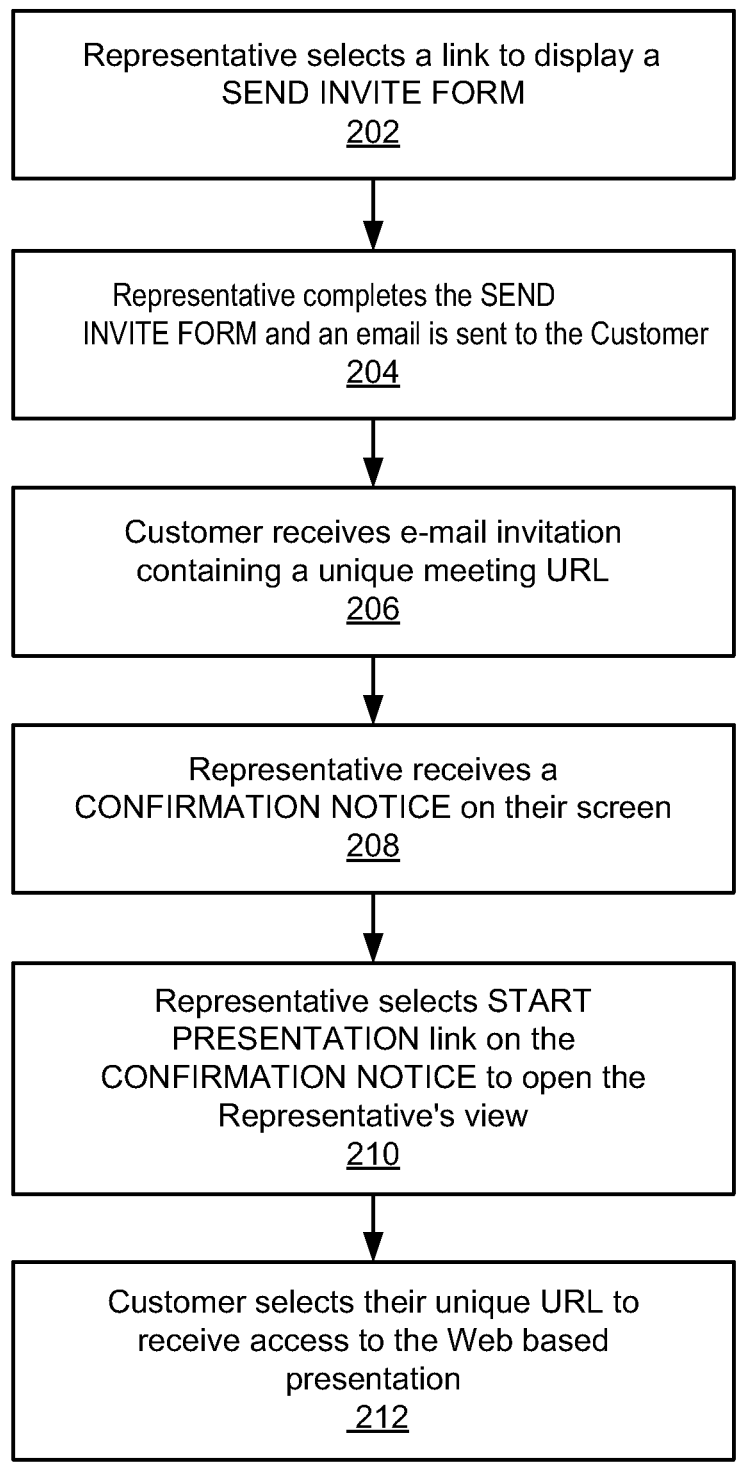
FIG. 2 presents a flow diagram describing initiating the process of the Web based sales presentations with synchronized dual display, in accordance with one embodiment.

FIG. 2 presents a flow diagram describing the process of initiating the Web based sales presentations with synchronized dual display, in accordance with one embodiment. In process 202, the rep selects a web-link presented on the website initiation page, to bring up a SEND INVITE FORM 302, as illustrated in FIG. 3, in accordance with one embodiment. In process 204, the rep fills in the selected fields (e.g., Presentation Style 306, Rep ID 308, Manager ID 310, and Customer Email 312) and then proceeds to click the SEND INVITE 314 button located on the SEND INVITE FORM 302.

Figure 4:
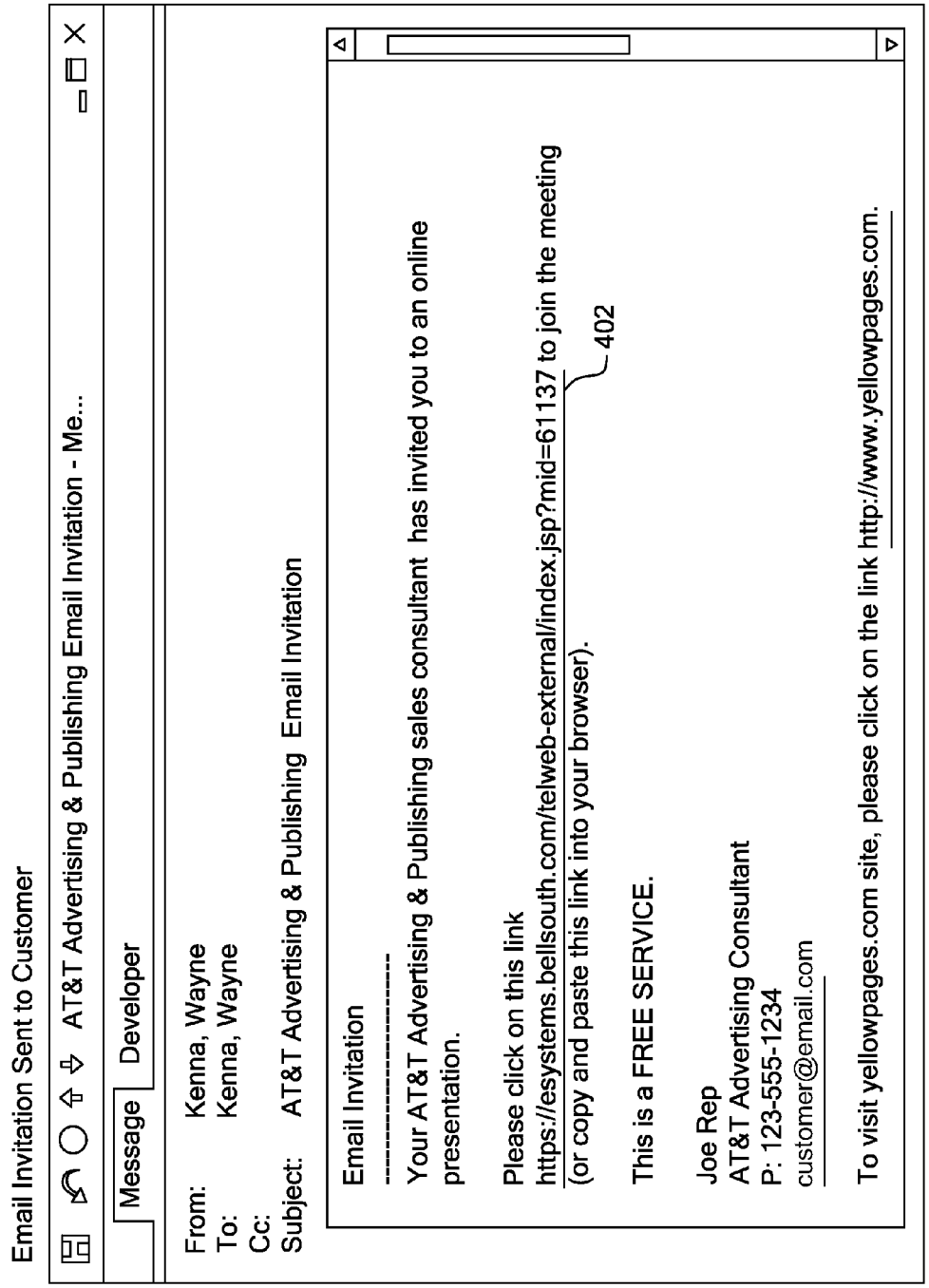
FIG. 4 presents an illustration of an email invitation containing a unique meeting URL, in accordance with one embodiment.
Figure 5:
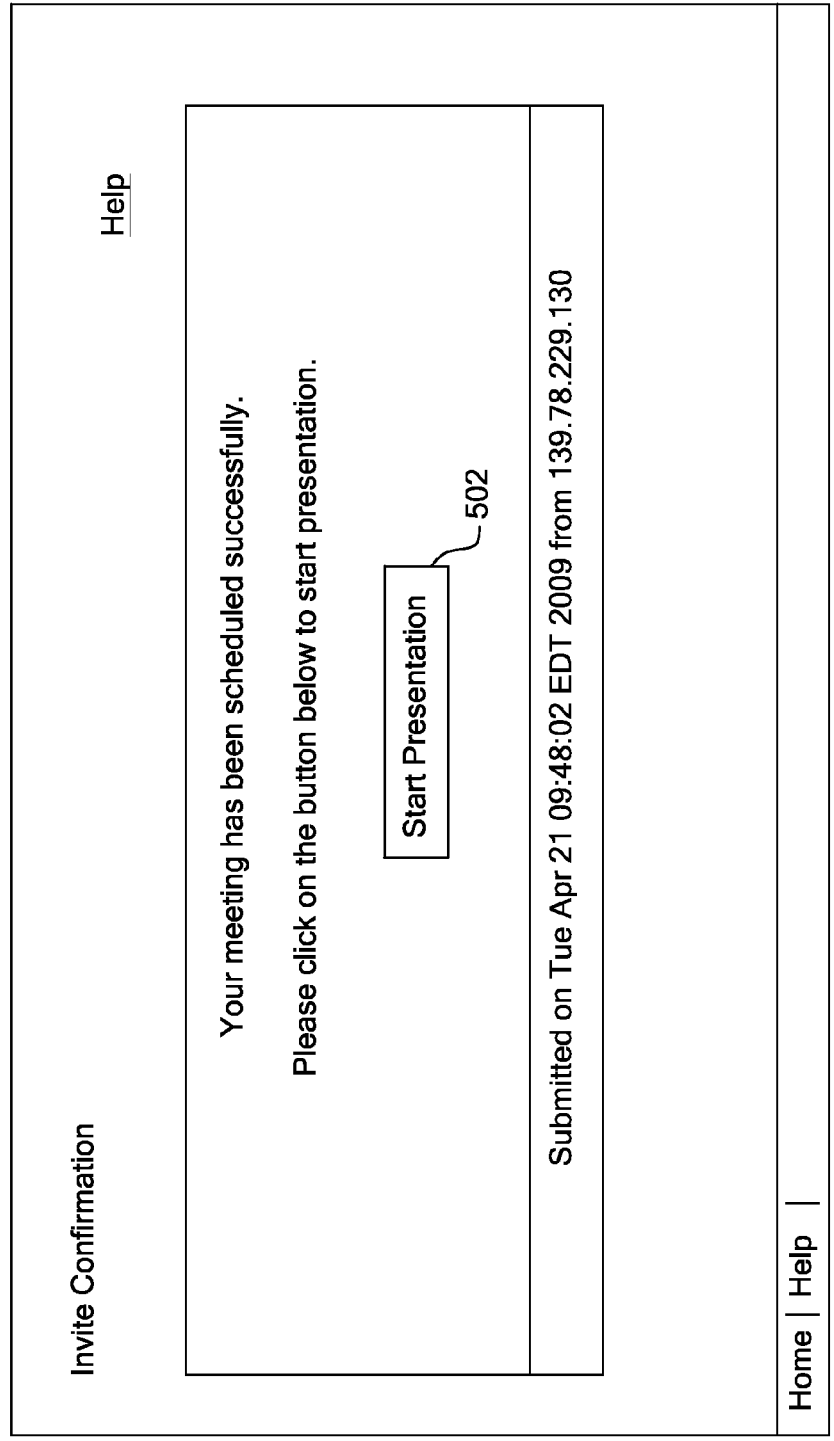
FIG. 5 presents an illustration of a CONFIRMATION NOTICE, in accordance with one embodiment.
Figure 6A:
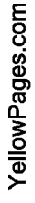
FIG. 6 presents an illustration of a sales representative's view, in accordance with one embodiment.

In process 206, the customer will receive an email invitation containing a unique meeting URL 402, as illustrated in FIG. 4, in accordance with one embodiment. In process 208, after sending the email invitation to the customer, the sales rep promptly receives a CONFIRMATION NOTICE on their screen, as illustrated in FIG. 5, in accordance with one embodiment. In process to 210, the rep selects the START PRESENTATION button 502 to open the rep's view as illustrated in FIG. 6A, in accordance with one embodiment. The rep's view includes navigational links 604 to navigate the presentation with the customer (e.g., one slide at a time).

Figure 6B:
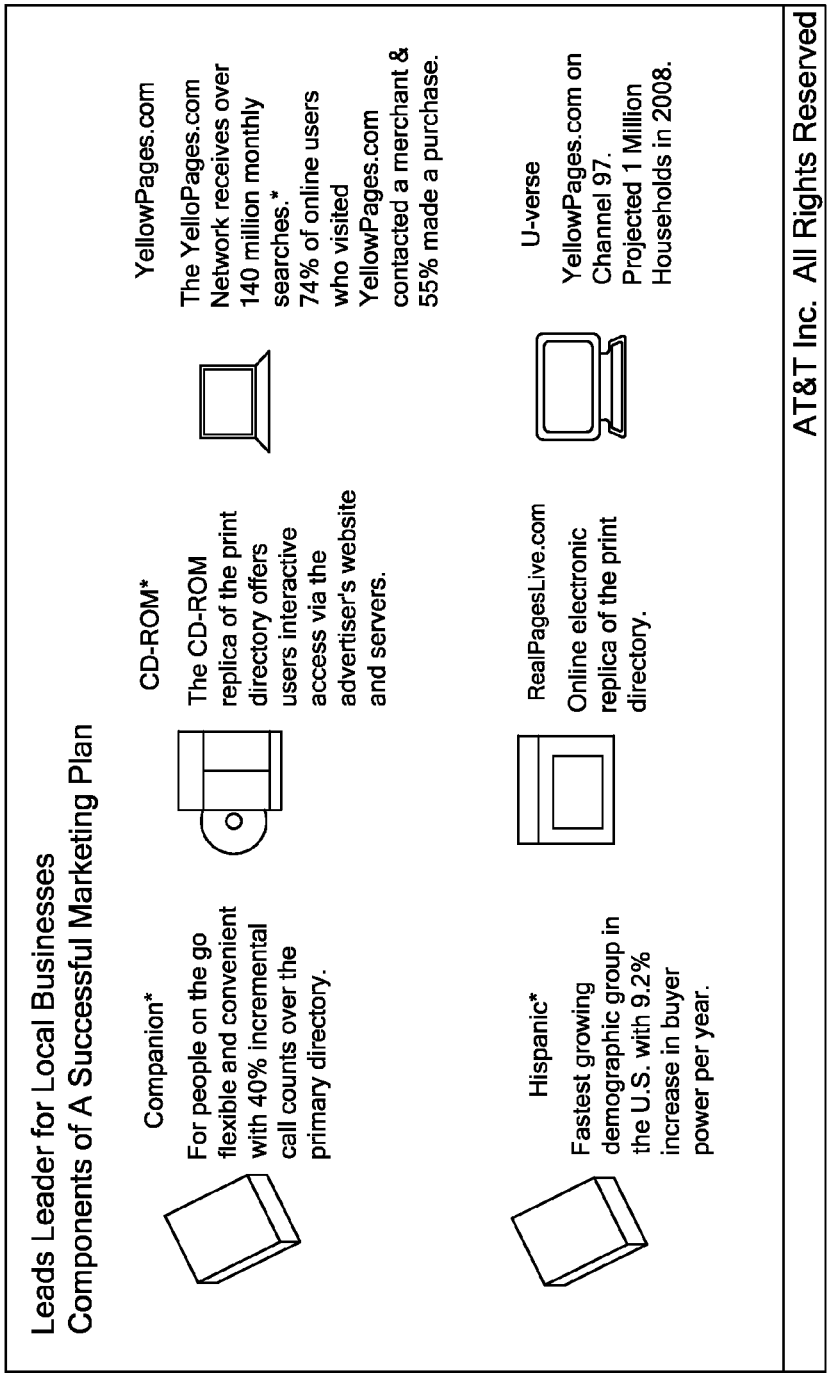

In process 212, once the customer selects on their URL link 402 and the rep selects the START PRESENTATION BUTTON 502, the customer's remote view of the presentation is made available to the customer, as illustrated in FIG. 6B in accordance with one embodiment. The navigational links are not included in the customer's view. At this point, the rep is able to give the presentation by selecting from one slide to the next.

Figure 7:
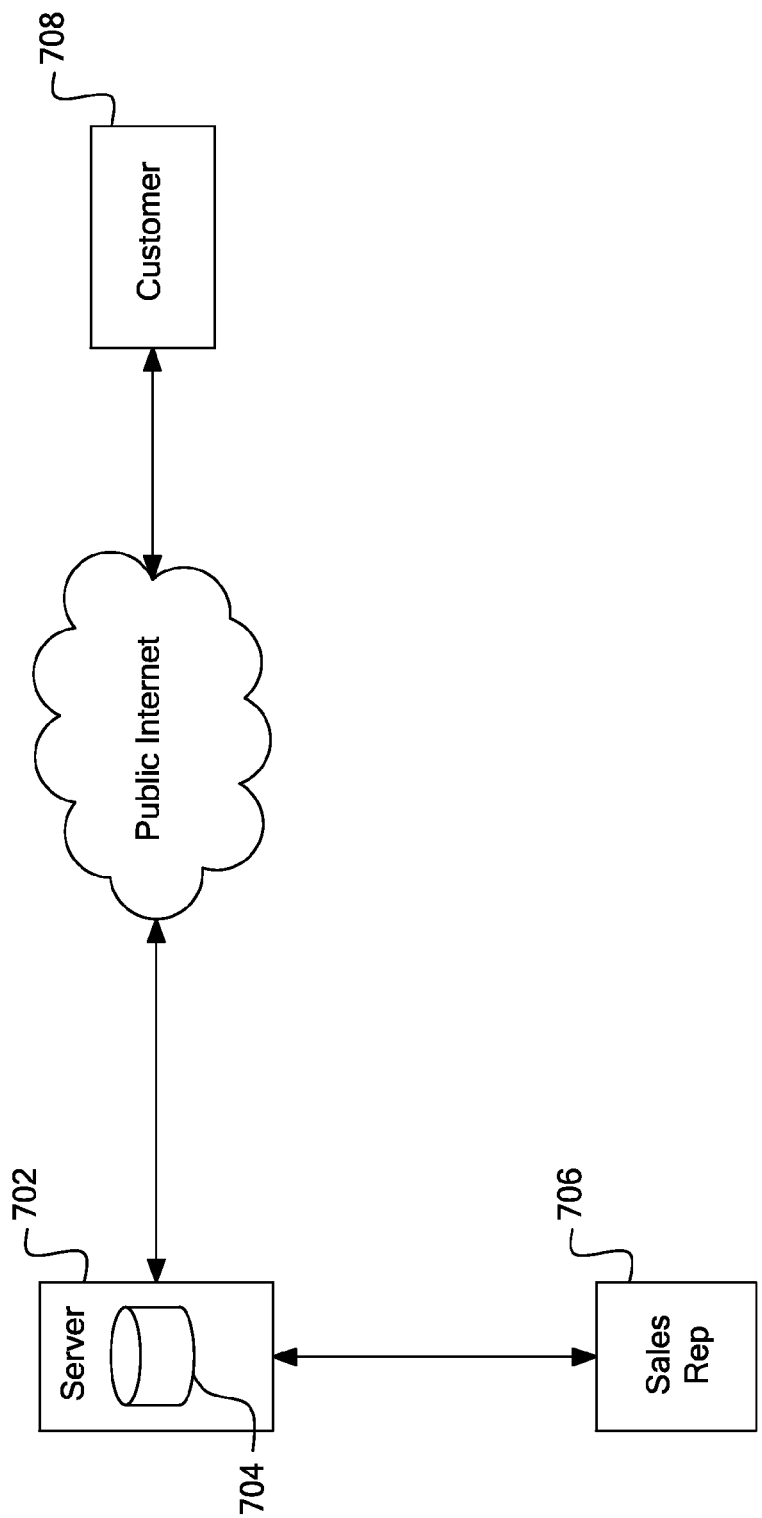
FIG. 7 presents an illustration of a system diagram, in accordance with one embodiment.

In one embodiment, as illustrated in the system diagram of FIG. 7, the presentation material is stored at a centralized location 704 associated with a server 702. A first separate computer of the sales representative 706 as well as a second separate computer system of the customer 708, may both gain access to the presentation centrally stored. As a result, sales and marketing can ensure a consistent message to customers about products and services. Presenters do not need to upload material to a server or worry about having the latest version.

Figure 8:
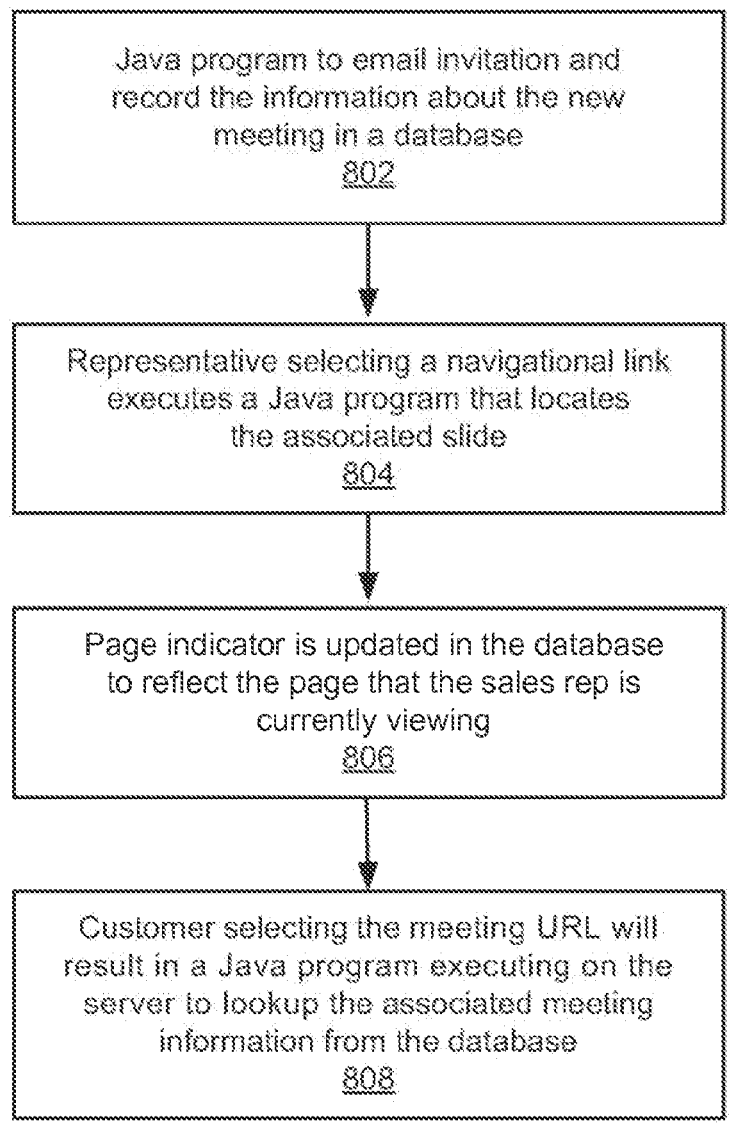
FIG. 8 presents a flow diagram describing the process of the Web based sales presentations with synchronized dual display, according to one embodiment.

One embodiment utilizes applications built into web browsers (e.g., HTML, JavaScript, and AJAX) along with backend processes (e.g., JSP, Java, and Oracle) to keep the sales rep and customer screens in sync, as described in more detail in the flow diagram of FIG. 8. As described above, initially the sales rep initiates the process by submitting an Invitation for the customer to join a meeting. In process 802, submitting the Invitation executes a Java program to email the customer a meeting invitation (including the URL for the meeting) and records the information about the new meeting (including a unique meeting id) in a database (e.g., a relational database).

As discussed above, a confirmation screen (see FIG. 5) is presented to the sales rep, once the email is sent. The sales rep then activates the meeting by pressing the Start Presentation button on the confirmation screen.

Once the meeting is activated, a new screen is displayed to the sales rep that includes navigational links 604 to the slides for their presentation (see FIG. 6A). The sales rep can select any link 604 to display a slide from the list of slide links 604 in the navigation area. In process 804, selecting a navigation link 604 executes a Java program that locates the associated slide graphic and talking points. In process 806, a page indicator is updated in the database (for this meeting id) to reflect the page that the sales rep is currently viewing. The sales rep's screen is refreshed to display the selected slide graphic and talking points. In one embodiment, this process is repeated each time the sales rep selects a navigation link 604.

Once the customer receives the meeting invitation via email, the customer can select the meeting URL that is contained in the message body of the email (see FIG. 4). In process 808, the customer selecting the meeting URL will execute a Java program on the server to lookup the associated meeting information (for this meeting id) from the database. The current slide graphic (that matches the sales rep's display) is located and displayed on the customer's screen. (See FIG. 6B). In one embodiment, approximately every 4 seconds, an AJAX function in the customer's web browser is executed to determine if any of the meeting information in the database has changed. Changes in the meeting information will occur when the sales rep selected a navigation link 604 as described above. If any change is detected, a Java program is executed to locate the current slide (that matches the sales rep's display) and is displayed on the customer's view. In one embodiment, this process is repeated automatically about every 4 seconds, to keep the customer's view in sync with the sales rep's view. The customer does not have to perform any other actions to keep the screens in sync.

In this description, various functions and operations may be performed by or caused by the execution of software code that produces the result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

At least some aspects disclosed can be embodied, at least in part, in software. That is, the techniques may be carried out in a computer system or other data processing systems in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A computer-readable media can be used to store software and data, which when executed by a data processing system, causes the system to perform various methods. The executable software and data may be stored in various places including, for example, ROM, volatile RAM, non-volatile memory and/or cache. Portions of this software and/or data may be stored in any one of these storage devices.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, at a processor from a sales representative, a request to send an invitation to a customer for a meeting to view a presentation comprising a plurality of slides, the request comprising contact information for the customer and an identification of the presentation;
   sending, by the processor to the customer, the invitation, the invitation comprising a link for accessing the presentation;
   recording, by the processor in a database, meeting information about the meeting, the meeting information comprising a meeting identification associated with the meeting and a page indicator associated with the presentation;
   in response to sending the invitation to the customer, providing, by the processor to the sales representative, a confirmation notice comprising a link to activate the meeting and start the presentation;
   in response to receiving a selection of the link to active the meeting and start the presentation from the sales representative, providing, by the processor to the sales representative, a first sales representative display of the presentation comprising navigational links representing the plurality of slides of the presentation and comprising a first slide of the plurality of slides;
   in response to receiving the selection of the link for accessing the presentation from the customer and without requiring the customer to provide login information, providing, by the processor to the customer a first customer display of the presentation comprising the first slide of the plurality of slides and excluding the navigational links representing the plurality of slides of the presentation;
   receiving, at the processor from the sales representative, a selection of a navigational link from the navigational links, the navigational link representing a second slide of the plurality of slides;
   in response to receiving the selection of the navigational link representing the second slide from the sales representative,
      providing, by the processor to the sales representative, a second sales representative display of the presentation comprising the navigational links representing the plurality of slides of the presentation and comprising the second slide of the plurality of slides, and
      updating, by the processor, the meeting information associated with the meeting and recorded in the database, wherein updating the meeting information associated with the meeting comprises updating the page indicator to reflect that the sales representative is viewing the second slide of the plurality of slides; and
   in response to a function of a first web browser associated with the customer determining that the meeting information associated with the meeting and recorded in the database has changed;
      locating, by the processor, the second slide and talking points based on the meeting identification, and
      providing, by the processor to the customer, a second customer display of the presentation comprising the second slide of the plurality of slides and continuing to exclude the navigational links representing the plurality of slides of the presentation, wherein locating the second slide and the talking points based on the meeting identification and the page indicator and providing, to the customer, the second customer display of the presentation comprising the second slide of the plurality of slides occur without any action by the customer.

2. The method of claim 1, wherein the first customer display of the presentation and the second customer display of the presentation are provided to the customer for display, via the first web browser, on a user device associated with the customer.

3. The method of claim 2, wherein displaying the first customer display of the presentation and the second customer display of the presentation on the user device associated with the customer does not require client software in addition to the first web browser.

4. The method of claim 3, wherein the first sales representative display of the presentation and the second sales representative display of the presentation are provided to the sales representative for display, via a second web browser, on a user device associated with the sales representative.

5. The method of claim 4, wherein displaying the first sales representative display of the presentation and the second sales representative display of the presentation on the user device associated with the sales representative does not require client software in addition to the second web browser.

6. The method of claim 1, further comprising providing to the sales representative, a form for making the request to send the invitation to the customer, the form comprising a presentation style field, a sales representative identification field, a manager identification field, and a customer email field.

7. The method of claim 1, wherein the invitation is sent to the customer via email.

8. The method of claim 1, wherein the link for accessing the presentation is a unique uniform resource locator directed to a website.

9. A non-transitory tangible machine-readable medium storing instructions that, when executed by a processor, cause the processor to perform operations comprising:
   receiving, from a sales representative, a request to send an invitation to a customer for a meeting to view a presentation comprising a plurality of slides, the request comprising contact information for the customer and an identification of the presentation;
   recording meeting information about the meeting, the meeting information comprising a meeting identification associated with the meeting and a page indicator associated with the presentation;
   sending, to the customer, the invitation, the invitation comprising a link for accessing the presentation;
   in response to sending the invitation to the customer, providing, to the sales representative, a confirmation notice comprising a link to activate the meeting and start the presentation;
   in response to receiving a selection of the link to activate the meeting and start the presentation from the sales representative, providing to the sales representative, a first sales representative display of the presentation comprising navigational links representing the plurality of slides of the presentation and comprising a first slide of the plurality of slides;
   in response to receiving the selection of the link for accessing the presentation from the customer and without requiring the customer to provide login information, providing, to the customer a first customer display of the presentation comprising the first slide of the plurality of slides and excluding the navigational links representing the plurality of slides of the presentation;
   receiving from the sales representative, a selection of a navigational link from the navigational links, the navigational link representing a second slide of the plurality of slides;
   in response to receiving the selection of the navigational link representing the second slide from the sales representative,
      providing a second sales representative display of the presentation comprising the navigational links representing the plurality of slides of the presentation and comprising the second slide of the plurality of slides, and
      updating the meeting information associated with the meeting and recorded in the database, wherein updating the meeting information associated with the meeting comprises updating the page indicator to reflect that the sales representative is viewing the second slide of the plurality of slides; and in response to a function of a first web browser associated with the customer determining that the meeting information associated with the meeting and recorded in the database has changed,
      locating the second slide and talking points by executing a program using the meeting identification and the page indicator, and
      providing, to the customer, a second customer display of the presentation comprising the second slide of the plurality of slides and continuing to exclude the navigational links representing the plurality of slides of the presentation, wherein locating the second slide and the talking points using the meeting identification and the page indicator and providing, to the customer, the second customer display of the presentation comprising the second slide of the plurality of slides occur without any action by the customer.

10. An apparatus comprising:
a processor; and
a memory storing instructions that, when executed by the processor, cause the processor to perform operations comprising:
   receiving, from a sales representative, a request to send an invitation to a customer for a meeting to view a presentation comprising a plurality of slides, the request comprising contact information for the customer and an identification of the presentation,
   sending, to the customer, the invitation, the invitation comprising a link for accessing the presentation,
   recording meeting information about the meeting, the meeting information comprising a meeting identification associated with the meeting and a page indicator associated with the presentation,
   in response to sending the invitation to the customer, providing, to the sales representative, a confirmation notice comprising a link to activate the meeting and start the presentation,
   in response to receiving a selection of the link to activate the meeting and start the presentation from the sales representative, providing, to the sales representative, a first sales representative display of the presentation comprising navigational links representing the plurality of slides of the presentation and comprising a first slide of the plurality of slides,
   in response to receiving the selection of the link for accessing the presentation from the customer and without requiring the customer to provide login information, providing, to the customer a first customer display of the presentation comprising the first slide of the plurality of slides and excluding the navigational links representing the plurality of slides of the presentation,
   receiving, from the sales representative, a selection of a navigational link from the navigational links, the navigational link representing a second slide of the plurality of slides,
   in response to receiving the selection of the navigational link representing the second slide from the sales representative,
      providing a second sales representative display of the presentation comprising the navigational links representing the plurality of slides of the presentation and comprising the second slide of the plurality of slides, and
      updating the meeting information associated with the meeting and recorded in the database, wherein updating the meeting information associated with the meeting comprises updating the page indicator to reflect that the sales representative is viewing the second slide of the plurality of slides, and in response to a function of a first web browser associated with the customer determining that the meeting information associated with the meeting and recorded in the database has changed, locating the second slide and talking points by executing a program using the meeting identification and the page indicator, and providing, to the customer, a second customer display of the presentation comprising the second slide of the plurality of slides and continuing to exclude the navigational links representing the plurality of slides of the presentation, wherein locating the second slide and the talking points using the meeting identification and the page indicator and providing, to the customer, the second customer display of the presentation comprising the second slide of the plurality of slides occur without any action by the customer.

* * * * *